United States Patent [19]

Hanslik

[11] 3,969,956
[45] July 20, 1976

[54] TRANSMISSION FOR MULTISCREW EXTRUDER

[75] Inventor: Wilhelm Hanslik, Linz, Austria

[73] Assignee: Krauss-Maffei Aktiengesellschaft, Munich, Germany

[22] Filed: Aug. 29, 1975

[21] Appl. No.: 609,062

[30] Foreign Application Priority Data
Aug. 31, 1974 Germany............................ 2441865

[52] U.S. Cl.......................... 74/665 GD; 74/424.5; 74/424.7; 425/376
[51] Int. Cl.².................... F16H 37/06; F16H 1/18; A01J 21/02
[58] Field of Search......... 74/665 GD, 424.5, 424.7; 425/376 X

[56] References Cited
UNITED STATES PATENTS
2,186,522  1/1940  Ditges............................ 74/665 GD

*Primary Examiner*—Leonard H. Gerin
*Attorney, Agent, or Firm*—Karl F. Ross; Herbert Dubno

[57] ABSTRACT

A transmission for a multiscrew extruder comprises a central spur gear meshing with several peripheral spur gears disposed symmetrically therearound, each gear having herringbone teeth with an annular gorge separating its sections of opposite pitch. The central gear is axially immovably journaled at its ends in two roller bearings, which may also be combined with thrust bearings, mounted in opposite walls of a housing. The peripheral gears are each journaled with axial play in terminal roller bearings and in an intermediate roller bearing, the latter having individual inner and outer races large enough to slip over the toothed sections of these gears. The intermediate bearings are supported by split bushings in the gorges of the peripheral gears and are embraced, over a major fraction of their circumferences, by an annular housing partition surrounding the central gear; the free minor circumferential portions of these bearings extend into the gorge of the central gear.

10 Claims, 3 Drawing Figures

TRANSMISSION FOR MULTISCREW EXTRUDER

FIELD OF THE INVENTION

My present invention relates to a gear-type transmission adapted to drive several parallel load shafts at related speeds, especially the shafts of multiscrew extruders for thermoplastic material.

BACKGROUND OF THE INVENTION

Twin-screw extruders can be driven by a pair of meshing spur gears which are simply supported at opposite ends in journal bearings, advantageously of the roller type. With heavy-duty extruders, in which the spur gears must sustain considerable axial as well as flexural stresses, the spur gears are frequently provided with herringbone teeth and with supplemental intermediate journal bearings, the latter receiving tooth-free median zones separating the helically toothed gear sections of opposite pitch. Heretofore, these intermediate bearings had to be split to facilitate their mounting in a stationary support, such as a partition of a cylindrical gear housing; plain bearings with bronze linings were normally used for this purpose. The effective lubrication of such bearings, with their low journal speeds, generally requires a forced circulation of oil for which the energy must be supplied by the input shaft driving one of the meshing gears. Such an arrangement not only entails additional expenses but also subjects the driving and driven gears to unbalanced torques, thereby limiting the axial extent of the area of effective mesh.

An earlier proposal designed to enable the use of undivided anti-friction journal bearings at intermediate locations involves the axial subdivision of each gear into separate sections which are positively coupled with one another after assembly and may be supported on a common shaft. Such a system, too, is relatively complex and correspondingly expensive.

OBJECTS OF THE INVENTION

The general object of my present invention, therefore, is to provide an improved transmission obviating the aforestated drawbacks.

A more particular object is to provide a transmission of this type, insertable between a drive shaft and the several screw shafts of a multiscrew extruder, which operates efficiently and with little maintenance even at elevated speeds and does not overload its spur gears and their bearings.

SUMMARY OF THE INVENTION

In accordance with my present invention, a unitary central spur gear centered on the axis of the stationary support is in mesh with a plurality of peripheral or satellite spur gears symmetrically distributed thereabout, each spur gear having two axially spaced toothed sections — preferably with herringbone teeth — separated by a median zone which forms an annular gorge or groove at least in the case of the central gear. Two sets of terminal bearings on the support receive respective extremities of the central and peripheral spur gears. The median zones of the peripheral spur gears are received in respective intermediate journal bearings on the support, these intermediate bearings having undivided inner and outer races large enough to slip over the toothed sections of the peripheral spur gears and extending in part into the gorge of the central spur gear.

My improved transmission is particularly suitable for an extruder in which a main screw of relatively large diameter coacts with two or more ancillary screws, e.g. as described in my copending U.S. application Ser. No. 456,251 filed 29 Mar. 1974 now U.S. Pat. No. 3,929,322. The centrally symmetrical distribution of the ancillary screws and the associated peripheral spur gears about the axis relieves the main screw and the central spur gear of flexural stresses so that two end bearings will suffice for that gear. Thus, in accordance with my present invention, the median zone of the central spur gear need not be supported and can therefore be reduced, as described above, to accommodate the oversize journal bearings for the corresponding zones of the peripheral gears.

Such a gear transmission is of simple construction and inexpensive to manufacture. Its compactness, especially in the axial direction, makes it suitable for use in equipment of limited space. Uniform meshing between the gear teeth over the entire length of the toothed gear sections reduces the torsional stresses and increases the service life of the gears. Such a unit, therefore, will withstand even rough and widely varying operating conditions for long periods and is thus particularly adapted for use in a large-capacity plastic extruder.

In a multiscrew extruder with a main screw and $n$ ancillary screws, as described in the above-identified copending application, the ancillary screws generally have a pitch diameter equaling $1/n^{th}$ the pitch diameter of the main screw. This ratio also holds true for the pitch diameters of the corresponding spur gears; with a transmission having two diametrically opposite peripheral gears, therefore, their pitch diameter would then be half that of the central gear.

Advantageously, to simplify the machining of the gear teeth, the median zones of the peripheral spur gears are also reduced in diameter so as to form annular grooves similar to the gorge of the central gear. In that case, the grooves are occupied by split bushings supporting the inner races of the intermediate bearings, the outer radius of the bushings being at last slightly larger than the crown radius of the toothed sections of the intermediate gears to facilitate the emplacement of the intermediate bearings. The outer races of these bearings may be embraced, over a major fraction of their circumferences, by part-circular cutouts in a partition of the surrounding gear housing; since no forces are transmitted from the driven central gear to the peripheral gears in the region of their median zones, the incomplete seating of the intermediate bearings in the partition is entirely acceptable.

BRIEF DESCRIPTION OF THE DRAWING

The above and other features of my invention will now be described in detail with reference to the accompanying drawing in which.

SPECIFIC DESCRIPTION

Figure 1:
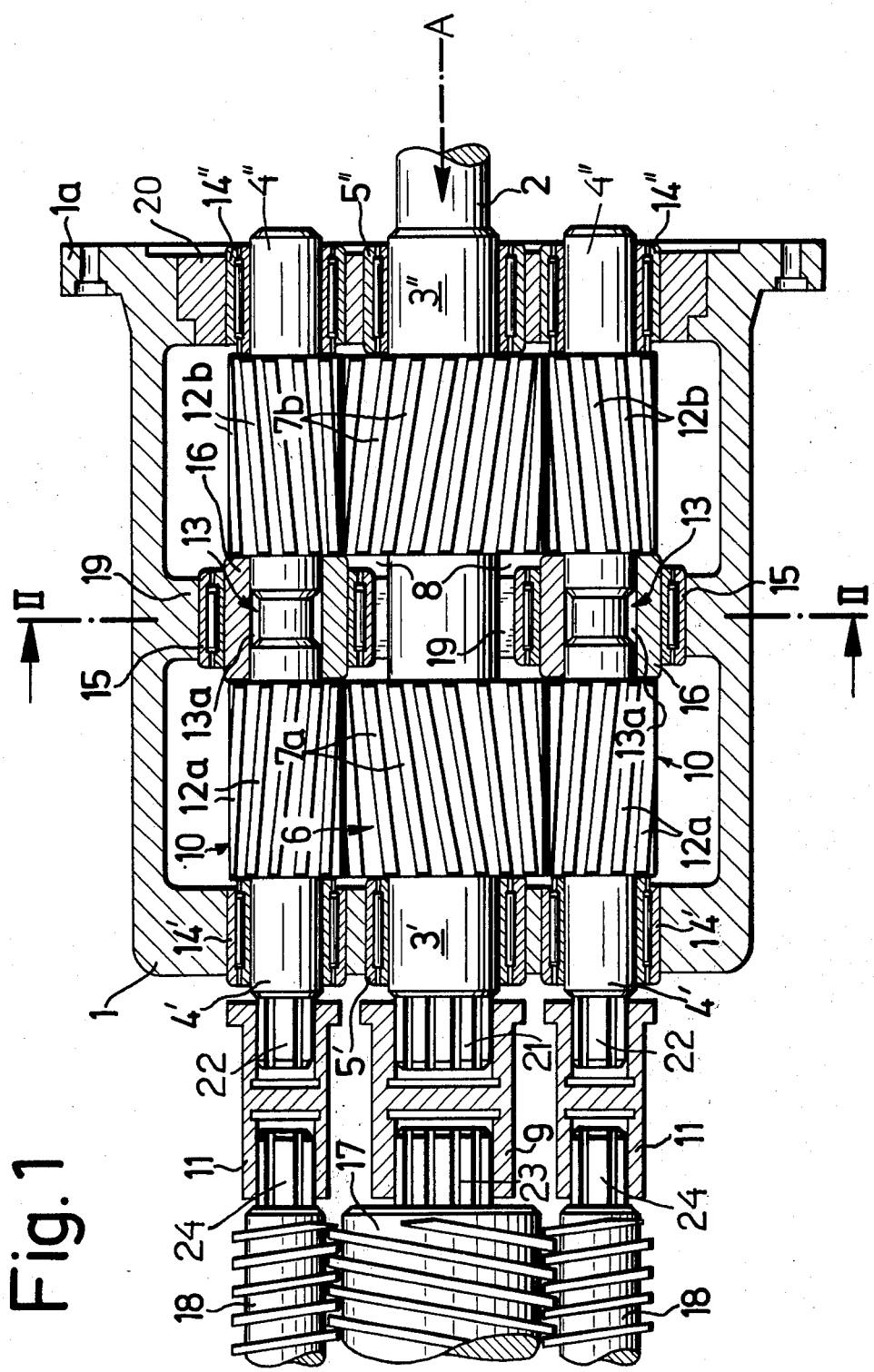
FIG. 1 is an axial sectional view of a gear transmission according to the invention, also showing part of an associated multiscrew extruder.

The transmission shown in the drawing comprises a generally cylindrical housing 1 provided with a flange 1a by which it may be attached to a nonillustrated motor unit driving an input shaft 2 centered on the housing axis A. Shaft 2 is rigid with a central spur gear 6 whose extremities or hubs 3', 3'' are journaled in respective roller bearings 5', 5'' (FIG. 1) that are mounted in opposite end walls of the housing. Similar roller bearings 14', 14'' in these housing walls receive the extremities 4', 4'' of two diametrically opposite peripheral or satellite spur gears 10 whose axes are parallel to central axis A. The wall carrying the bearings 5'' and 14'' is shown as a removable cover plate 20.

Each of the three spur gears 6 and 10 is longitudinally subdivided into two mirror-symmetrical toothed sections of opposite helical pitch forming a herringbone gearing, these sections having been designated 7a, 7b in the case of central gear 6 and 12a, 12b in the case of peripheral gears 10. The pitch diameter of gear sections 7a and 7b is twice that of gear sections 12a and 12b in mesh therewith. For the relief of axial stresses, the peripheral gears 10 are floatingly mounted with limited axial play; the axial position of gear 6 is fixed by its mounting.

Figure 2:
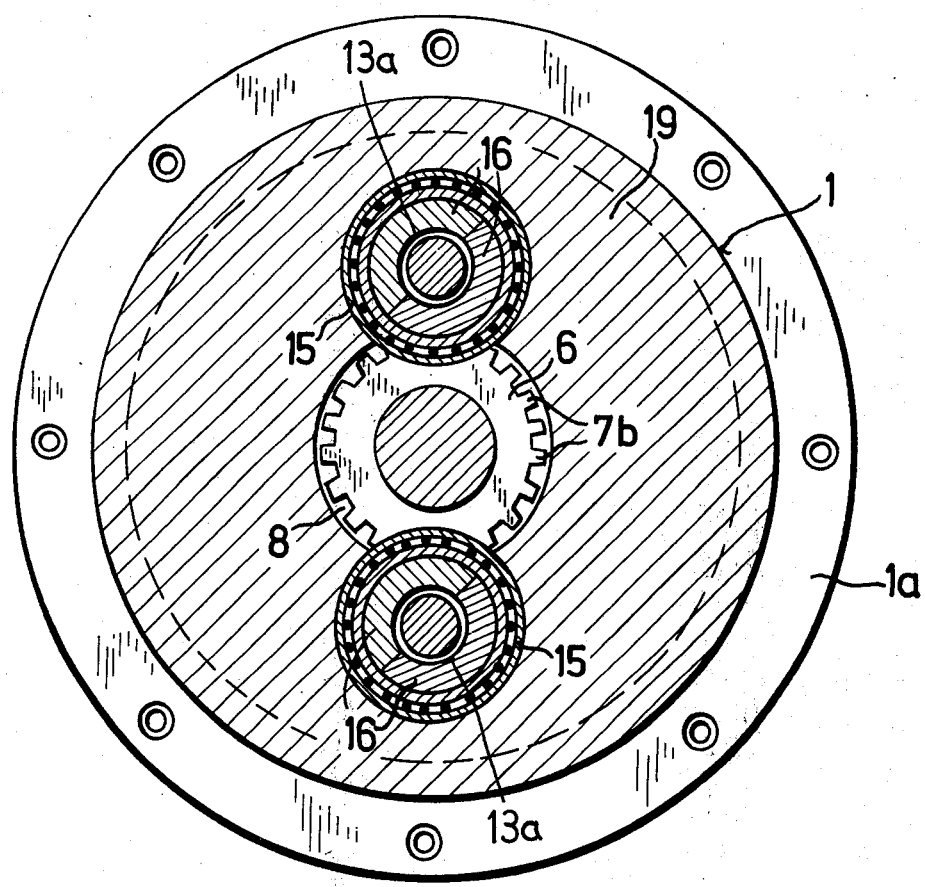
FIG. 2 is a cross-sectional view taken on the line II — II of FIG. 1.

A median zone 8 of central gear 6, separating its toothed sections 7a and 7b, is reduced in diameter to form an annular gorge. A similar reduction in the diameter of the median zones of peripheral gears 10 results in the formation of annular grooves 13 coplanar with gorges 8. These median zones are aligned with an annular partition 19 of housing 20 which, as shown in FIG. 2, is formed with two diametrically opposite part-circular cutouts 15 embracing about three fourths of the circumference of the outer races of two intermediate roller bearings 15 whose inner races are wide enough to slip over the toothed sections 12a, 12b of the gears 10. Split bushings 16 seated in grooves 13, consisting of complementary semicylindrical half-shells, support the inner races of bearings 15. It will be noted that both races of these bearings are solid and undivided, their unsupported quadrants extending into the gorge 8 of central gear 6. The grooves 13 of peripheral gears 10 are further recessed at 13a to form annular clearances within bushings 16 for additional stress relief.

Figure 1A:
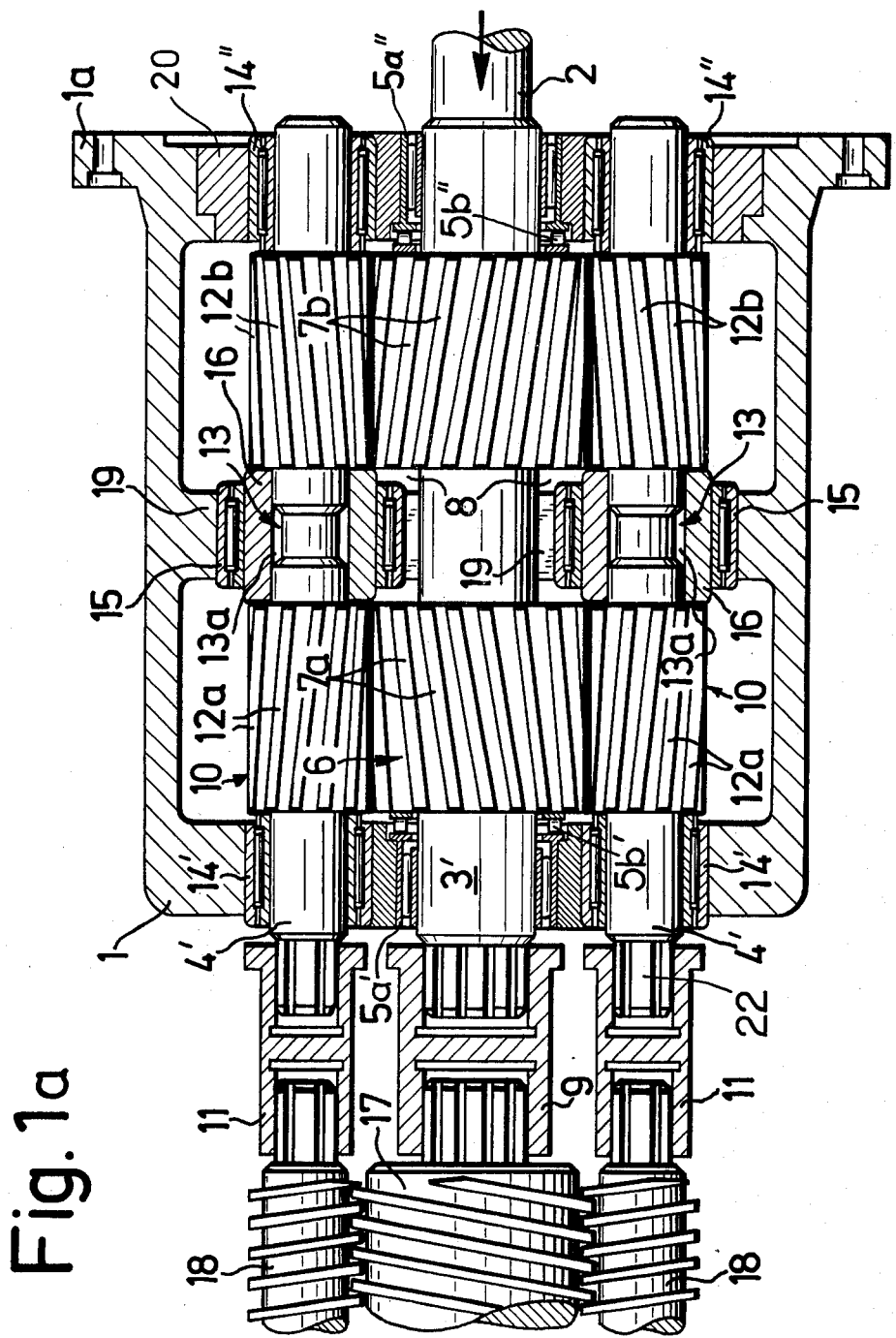
FIG. 1a is a view similar to FIG. 1, illustrating a modification.

The limited axial shiftability of the peripheral or satellite gears 10 is brought about by a foreshortening of the rollers of bearings 14', 14'', 15 and of the outer races of bearings 14' and 14''. As shown in FIG. 1a, the journal bearings 5' and 5'' supporting the central gear 6 may be replaced by shorter roller bearings 5a', 5a'' combined with thrust bearings 5b', 5b'' serving to fix the axial position of that gear.

The extremities or hubs 3' and 4' of gears 6 and 10 have splined extensions 21, 22 which constitute counter-rotating output shafts and are connected via correspondingly fluted coupling sleeves 9 and 11 with similarly splined shafts 23, 24 of a main feed screw 17 and two ancillary feed screws 18 of a multiscrew extruder not further illustrated. The main screw 17 is of the double-thread type whereas each ancillary screw 18 has only a single thread. The pitch diameters of these screws, like those of gears 6 and 10, are in a ratio of 2 : 1.

The unitary construction of all the gears 6, 10 and of the races of all the associated bearings makes the disclosed transmission relatively inexpensive to manufacture and simple to assemble. The system is well balanced and stresses are minimized to insure a long service life.

I claim:
1. A transmission comprising:
a stationary support centered on an axis;
a unitary central spur gear centered on said axis;
a plurality of unitary peripheral spur gears symmetrically distributed about said axis in mesh with said central spur gear, each of said spur gears being provided with two axially spaced toothed sections separated by a median zone and with extremities beyond said toothed sections, the mediam zone of said central gear forming an annular gorge;
two sets of terminal bearings on said support receiving respective extremities of said central and peripheral spur gears; and
a set of intermediate journal bearings on said support each receiving said median zone of a respective peripheral spur gear, said intermediate journal bearings having undivided inner and outer races large enough to slip over the toothed sections of said peripheral spur gears, parts of said intermediate journal bearings extending into said gorge.

2. A transmission as defined in claim 1 wherein said toothed sections of each of said spur gears have helical teeth of opposite pitch.

3. A transmission as defined in claim 2 wherein said peripheral spur gears are axially shiftable.

4. A transmission as defined in claim 3 wherein said terminal bearings include combined thrust and journal bearings holding said central spur gear in an axially fixed position.

5. A transmission as defined in claim 1 wherein said support comprises a generally cylindrical housing with end walls carrying said terminal bearings and an annular partition surrounding said central spur gear, said partition having part-circular cutouts embracing the outer races of said intermediate journal bearings over a major fraction of their circumferences.

6. A transmission as defined in claim 1 wherein the median zones of said peripheral spur gears form annular grooves, further comprising split bushings in said grooves supporting the inner races of said intermediate journal bearings.

7. A transmission as defined in claim 6 wherein said grooves are centrally recessed to form annular clearances within said bushings.

8. A transmission as defined in claim 1 wherein said terminal and intermediate bearings are roller bearings.

9. A transmission as defined in claim 1 wherein said peripheral spur gears have pitch diameters substantially equal to $1/n^{th}$ the pitch diameter of said central spur gear, $n$ being the number of said peripheral spur gears.

10. A transmission as defined in claim 1 further comprising an input shaft rigid with an extremity of said central spur gear, the other extremity of said central spur gear and adjacent extremities of said peripheral spur gears being provided with coupling means for connecting same with respective screws of a multiscrew extruder.

* * * * *